United States Patent
Rusch et al.

(10) Patent No.: US 9,829,064 B2
(45) Date of Patent: Nov. 28, 2017

(54) DRIVE TRAIN HAVING A SPUR GEARING AND A CENTRIFUGAL PENDULUM

(75) Inventors: Alain Rusch, Brumath (FR); Steffen Lehmann, Ettlingen (DE); Friedrich Gerhardt, Kehl-Leutesheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/342,892

(22) PCT Filed: Aug. 6, 2012

(86) PCT No.: PCT/DE2012/000791
§ 371 (c)(1),
(2), (4) Date: Jul. 7, 2014

(87) PCT Pub. No.: WO2013/034120
PCT Pub. Date: Mar. 14, 2013

(65) Prior Publication Data
US 2014/0329641 A1     Nov. 6, 2014

(30) Foreign Application Priority Data

Sep. 9, 2011 (DE) .......................... 10 2011 082 388

(51) Int. Cl.
*F16F 15/12* (2006.01)
*F16F 15/14* (2006.01)
(Continued)

(52) U.S. Cl.
CPC .............. *F16F 15/14* (2013.01); *B60W 10/06* (2013.01); *B60W 10/11* (2013.01); *F16F 15/145* (2013.01);
(Continued)

(58) Field of Classification Search
CPC ...... F16F 15/13128; F16F 15/22; F16F 15/31; F16F 15/464; F16F 15/1478;
(Continued)

(56) References Cited

U.S. PATENT DOCUMENTS 4,676,121 A * 6/1987 Kouno .......................... 74/433.5
2006/0009295 A1 * 1/2006 Song .......................... F16D 3/12
464/66.1

(Continued)

FOREIGN PATENT DOCUMENTS

DE    10 2009 023 337 A1    12/2009
DE    10 2009 042 831 A1    4/2010
(Continued)

OTHER PUBLICATIONS

Definition of "flywheel", retrieved from www.merriamwebster.com on May 25, 2017.*

*Primary Examiner* — Stacey Fluhart
(74) *Attorney, Agent, or Firm* — Alfred J. Mangels

(57) ABSTRACT

A drive train including an internal combustion engine with a crankshaft, and having a spur gear arrangement with at least one transmission input shaft that is coupled to the crankshaft by a friction clutch. A clutch plate within a housing of the friction clutch is connected in a rotationally locked manner to the at least one transmission input shaft and includes a centrifugal force pendulum. To accommodate the centrifugal force pendulum in the drive train in a space saving manner, the centrifugal force pendulum is situated on the at least one transmission input shaft at an axial distance from the clutch plate.

3 Claims, 3 Drawing Sheets

(51) Int. Cl.
  *F16H 57/00* (2012.01)
  *B60W 10/06* (2006.01)
  *B60W 10/11* (2012.01)

(52) U.S. Cl.
  CPC . *F16H 57/0006* (2013.01); *F16H 2057/0012* (2013.01); *Y10T 477/638* (2015.01)

(58) Field of Classification Search
  CPC ............ F16F 15/14781; F16F 15/1464; Y10T 74/18368; F16H 2057/0012; F16H 57/0006
  USPC ........................................................ 192/48.1
  See application file for complete search history.

(56) References Cited

U.S. PATENT DOCUMENTS

| | | | |
|---|---|---|---|
| 2007/0179012 A1* | 8/2007 | Kimura et al. ............... | 475/331 |
| 2008/0230342 A1* | 9/2008 | Friedmann et al. ......... | 192/48.1 |
| 2010/0269497 A1* | 10/2010 | Engelmann ........... | F16F 15/145 60/338 |
| 2011/0162480 A1 | 7/2011 | Ruder et al. ................ | 74/574.4 |
| 2012/0180473 A1* | 7/2012 | Huegel ............. | F16F 15/12373 60/435 |

FOREIGN PATENT DOCUMENTS

| | | |
|---|---|---|
| DE | 10 2010 018 941 A1 | 12/2010 |
| EP | 1 780 434 A2 | 5/2007 |
| EP | 2 108 859 A2 | 10/2009 |
| WO | WO 2010/028620 A1 | 3/2010 |

\* cited by examiner

DRIVE TRAIN HAVING A SPUR GEARING AND A CENTRIFUGAL PENDULUM

CROSS-REFERENCE TO RELATED APPLICATION

This application is a continuation of International Application Serial No. PCT/DE2012/000791, having an international filing date of 6 Aug. 2012, and designating the United States, the entire contents of which are hereby incorporated by reference to the same extent as if fully rewritten.

BACKGROUND OF THE INVENTION

Field of the Invention

The present invention relates to a drive train including an internal combustion engine with a crankshaft, and including a spur gear arrangement with at least one transmission input shaft that can be coupled to the crankshaft by means of a friction clutch. A clutch plate that is integrated in a housing of the friction clutch is connected in a rotationally locked manner to the at least one transmission input shaft, and the drive train includes a centrifugal force pendulum.

Description of the Related Art

To reduce torsional vibrations resulting from non-uniformities of rotational speed, for example of a crankshaft of an internal combustion engine, so-called centrifugal force pendulums are situated on a rotating part of the drive train and are provided with masses that are received in such a way that they can pivot in a circumferential direction relative to an axis of rotation. Those masses carry out vibrations on specified paths in the field of centrifugal acceleration when they are excited by rotational speed non-uniformities. Energy is extracted from the exciter vibration and is re-introduced by those vibrations at appropriate times, so that the exciter vibration is calmed; that is, the centrifugal force pendulum acts as a vibration absorber. Since both the natural frequency of the centrifugal force pendulum vibration and the exciter frequency are proportional to the speed of rotation, the vibration damping effect of a centrifugal force pendulum can be achieved over the entire frequency range.

A drive train with an internal combustion engine having a crankshaft, a spur gear arrangement provided on a transmission input shaft, and a friction clutch that couples the crankshaft and the transmission input shaft, as well as a centrifugal force pendulum that absorbs torsional vibrations of drive train, is known from DE 10 2009 042 831 A1. In that published application the centrifugal force pendulum is received on the friction clutch. The torque is introduced into a spur gear arrangement through the housing of the friction clutch, from the crankshaft through a clutch plate that is connected to the transmission input shaft. Furthermore, the centrifugal force pendulum can be integrated into a torsional vibration damper, such as a dual-mass flywheel, as is seen from DE 10 2010 018 941 A1. It is also known to integrate centrifugal force pendulums into the clutch plate itself.

The construction space of the drive train is limited for the most part, in particular in the area of torsional vibration dampers, friction clutches, clutch plates, and the like. The transmission of maximum torque has priority, so that in most cases there is little construction space available for a centrifugal force pendulum that works with sufficient vibration insulation.

An object of the present invention is therefore to provide a drive train in which a centrifugal force pendulum can be integrated into the drive train independent of the individual components such as a friction clutch and a torsional vibration damper.

SUMMARY OF THE INVENTION

The object is achieved by a drive train including an internal combustion engine with a crankshaft, and including a spur gear arrangement with at least one transmission input shaft that can be coupled to the crankshaft by means of a friction clutch. A clutch plate is integrated in a housing of the friction clutch and is connected in a rotationally locked manner to the at least one transmission input shaft. The drive train includes a centrifugal force pendulum, wherein the centrifugal force pendulum is carried on the at least one transmission input shaft at an axial distance from the clutch plate. For an improved and independent use of the available construction space, the centrifugal force pendulum is received with its pendulum flange, for example, directly on the transmission input shaft in a rotationally locked manner by means of teeth or by means of a hub. Depending upon the available construction space, the centrifugal force pendulum is connected to the transmission input shaft independent of other components of the drive train.

It has proven to be advantageous if the centrifugal force pendulum is situated outside of housings of other units, such as the dual-mass flywheel, the friction clutch, and the like. In an advantageous manner, the centrifugal force pendulum can be situated between the internal combustion engine and the friction clutch, between the friction clutch and a spur gear arrangement, or it can be integrated into a housing of the transmission. Furthermore, the centrifugal force pendulum can be situated on an end of the transmission input shaft that extends through the spur gear arrangement and that is opposite the clutch plate. The effect of positioning the centrifugal force pendulum on the transmission input shaft is fully preserved when the friction clutch is disengaged or is slipping, so that with the friction clutch disengaged, possibly in cooperation with a torsional vibration damper in the clutch plate, for example an idle damper, torsional vibrations that occur in the spur gear arrangement can be damped, hence preventing or at least reducing any rattling in the transmission.

In another exemplary embodiment of a drive train, the spur gear arrangement can be designed as a dual-clutch transmission with two sub-transmissions, each sub-transmission having a transmission input shaft, and wherein at least one centrifugal force pendulum is carried on a transmission input shaft that is in the form of a hollow shaft. Furthermore, with respect to the other drive train units, such as the friction clutch and/or a dual-mass flywheel, preferably a centrifugal force pendulum is provided, as proposed, on the transmission input shaft that is in the form of a hollow shaft.

According to an advantageous embodiment, the centrifugal force pendulum situated on the hollow transmission input shaft can be positioned in a construction-space-saving manner between spur gear pairs of the two sub-transmissions, so that a construction space advantage is achieved by integrating at least one of the centrifugal force pendulums into a dual-clutch transmission. For example, pendulum masses of the centrifugal force pendulum can be situated radially outside of at least one spur gear received on one of the transmission input shafts, and can at least partially axially overlap the latter.

BRIEF DESCRIPTION OF THE DRAWINGS

The invention will be explained in further detail on the basis of the exemplary embodiments depicted in FIGS. 1 through 5. The figures show the following.

DESCRIPTION OF THE PREFERRED EMBODIMENTS

Figure 1:
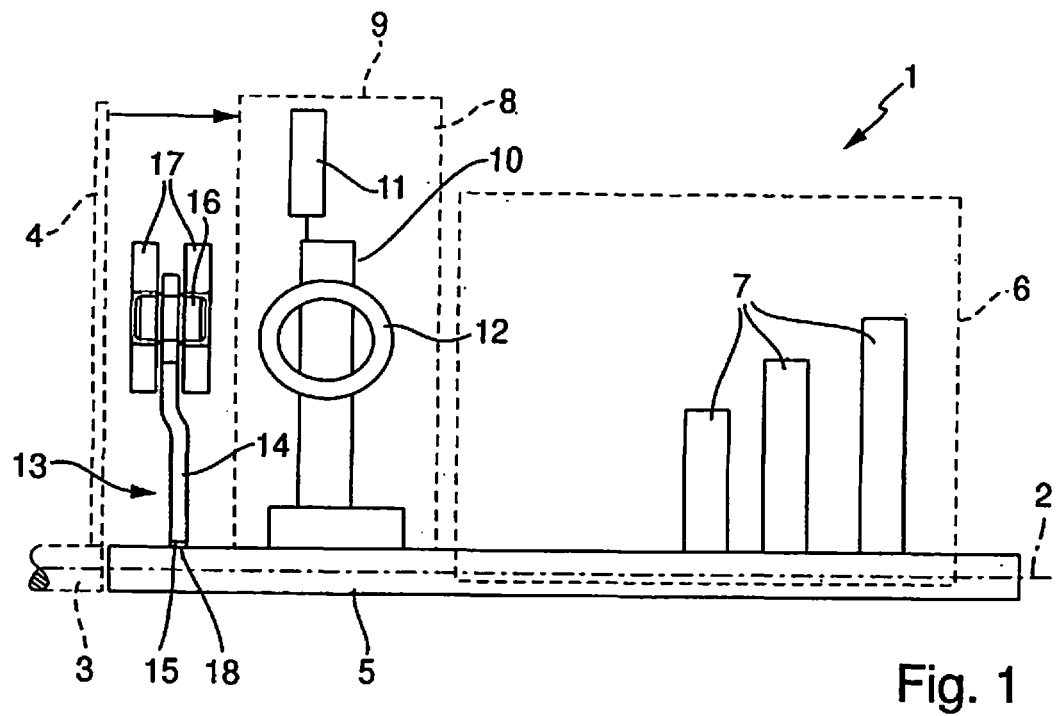
FIG. 1 is a schematically depicted cross section of a drive train having a centrifugal force pendulum situated between an internal combustion engine and a friction clutch, and directly on a transmission input shaft.

FIG. 1 shows in schematic, cross-sectional form the upper half of a drive train 1, positioned around the axis of rotation 2, with an internal combustion engine, of which only the crankshaft 3 and the flywheel 4, which can be a single or a dual-mass flywheel, are shown. Situated on the transmission input shaft 5 is a spur gear arrangement 6, with several spur gears 17 for setting different gear ratios with complementary spur gears, not shown, that mesh with spur gears 7 and that are positioned on a transmission output shaft, also not shown. Friction clutch 8 with the clutch housing 9 and the clutch plate 10 are also situated on transmission input shaft 5. The clutch housing 9 receives the torque of the crankshaft 3 through the flywheel 4 and transmits it, dependent upon the engagement state of the friction clutch 8, through the friction linings 11 of the clutch plate 10 to the transmission input shaft 5, to which the clutch plate 10, which includes a torsional vibration damper 12, is connected in a rotationally locked manner.

In the exemplary embodiment shown in FIG. 1, the centrifugal force pendulum 13 is accommodated in the construction space between the flywheel 4 and the friction clutch 8, and is connected directly to the transmission input shaft 5 in a rotationally locked manner such as by a meshing connection. The pendulum flange 14 of the centrifugal force pendulum 13 receives the pendulum masses 17 by means of rollers 16 on both sides of pendulum flange 14, and by means of the internal teeth 15 meshes in a rotationally locked manner with the complementary external teeth 18 of the transmission input shaft 5. Alternatively, the pendulum flange 14 can be received on a hub (not shown), which, in turn, is connected to the transmission input shaft 5 in a rotationally locked manner such as by a meshing connection, and on which the pendulum flange 14 is received in a rotationally locked manner or with limited torque by interposing a slip clutch (not shown).

Figure 2:
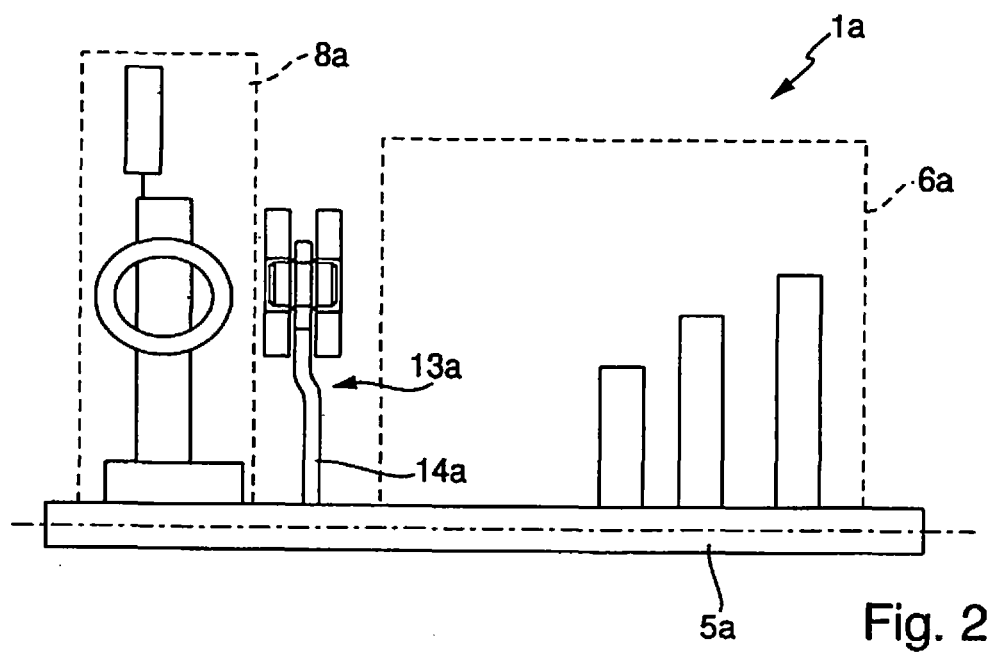
FIG. 2 is a schematically depicted cross section of a drive train having a centrifugal force pendulum situated between a friction clutch and a spur gear arrangement, and directly on a transmission input shaft.

In contrast to drive train 1 of FIG. 1, FIG. 2 shows a drive train 1a, with a friction clutch 8a that is spaced from the spur gear arrangement 6a. In this case, the centrifugal force pendulum 13a is received with its pendulum flange 14a directly on the transmission input shaft 5a in the construction space between friction clutch 8a and the spur gear arrangement 6a.

Figure 3:
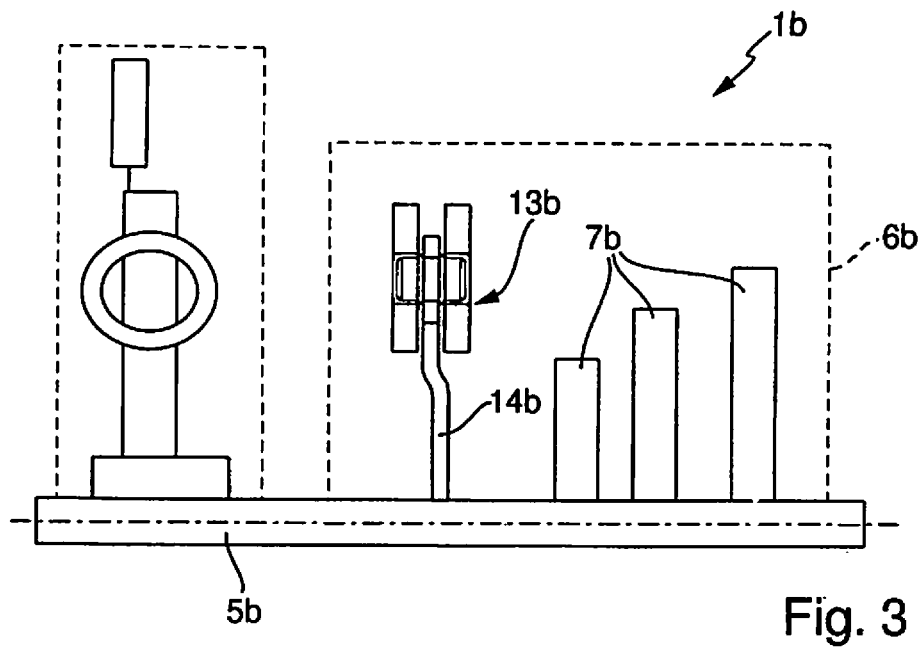
FIG. 3 is a schematically depicted cross section of a drive train having a centrifugal force pendulum integrated into a spur gear arrangement, and situated directly on a transmission input shaft.

FIG. 3 shows, as a modification of drive trains 1, 1a of FIGS. 1 and 2, the drive train 1b, with a pendulum flange 14b of centrifugal force pendulum 13b received directly on transmission input shaft 5b. Centrifugal force pendulum 13b is positioned within spur gear arrangement 6b and—as shown—is positioned axially next to and upstream of the spur gears 7b on the transmission input shaft 5b. Alternatively, the centrifugal force pendulum 13b can be positioned between the spur gears 7b.

Figure 4:
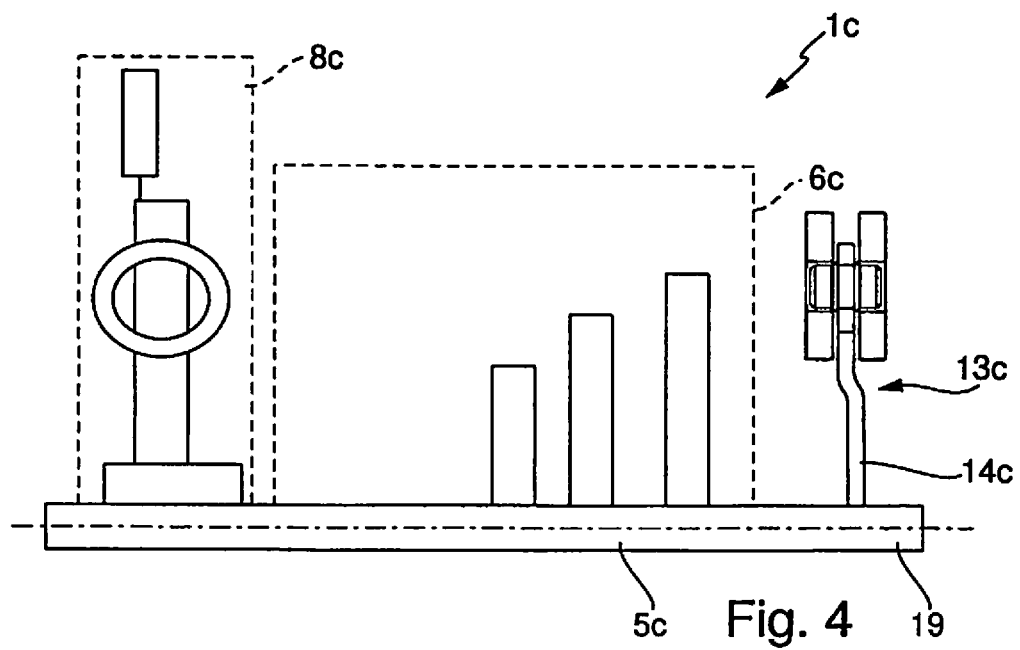
FIG. 4 is a schematically depicted cross section of a drive train having a centrifugal force pendulum situated directly on the end of a transmission input shaft that faces away from the friction clutch.

In a further modification, the drive train 1c of FIG. 4 is equipped—in contrast to the drive trains 1, 1a, 1b of FIGS. 1 through 3—with the centrifugal force pendulum 13c positioned directly on the transmission input shaft 5c on the downstream side of the spur gear arrangement 6c, the side of spur gear arrangement 6c that faces away from the friction clutch 8c. To that end, the transmission shaft 5c is extended axially to extend through the spur gear arrangement 6c, and receives the pendulum flange 14c of the centrifugal force pendulum 13c on the extended end 19 of transmission shaft 5c in a rotationally locked manner.

Figure 5:
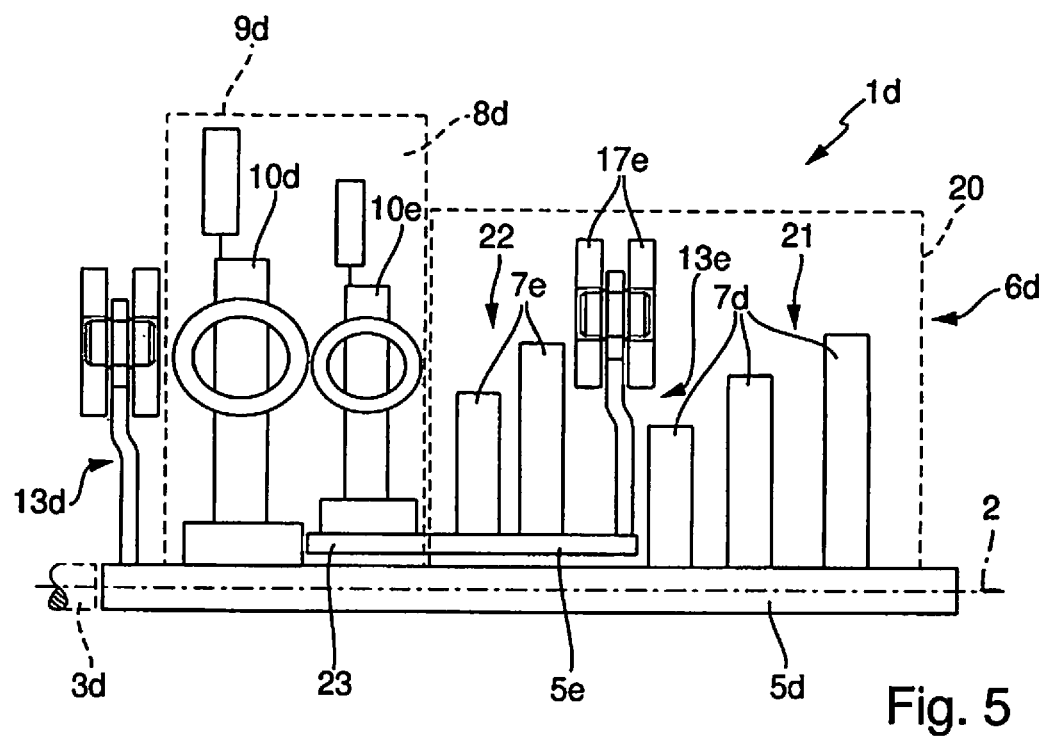
FIG. 5 is a schematically depicted cross section of a drive train having a dual-clutch transmission with two sub-transmissions, each sub-transmission having a separate transmission input shaft and each sub-transmission having a centrifugal force pendulum situated on the associated transmission input shaft.

FIG. 5 shows a schematic cross-sectional depiction of the upper half of the drive train 1d positioned around the axis of rotation 2, which, in contrast to the drive trains 1, 1a, 1b, 1c of FIGS. 1 through 4, contains the spur gear arrangement 6d in the form of a dual-clutch transmission 20 including two sub-transmissons 21, 22, each having gear sets with spur gears 7d, 7e situated on separate transmission input shafts 5d, 5e. Accordingly, the dual clutch 8d is provided with the clutch plates 10d, 10e, which independently of each other transmit the torque that is transmitted from a crankshaft 3d to the housing 9d of the dual clutch 8d to the transmission input shafts 5d, 5e.

Transmission input shafts 5d, 5e are positioned coaxially to each other. To that end, the transmission input shaft 5e is designed as a hollow shaft 23 and is situated around the transmission input shaft 5d. Connected to each of the two transmission input shafts 5d, 5e is a respective centrifugal force pendulum 13d, 13e, which is connected to the respective transmission input shaft in a rotationally locked manner. In the depicted exemplary embodiment, the centrifugal force pendulum 13e carried on the hollow shaft 23 is positioned within the dual-clutch transmission 20. The depicted exemplary embodiment shows the centrifugal force pendulum 13e situated between the two sets of gears of the respective sub-transmissions 21, 22. The pendulum masses 17e of centrifugal force pendulum 13e lie radially outwardly of the nearest spur gear of the spur gears 7d having the smallest diameter. Depending on the design of the complementary spur gears (not shown) of the transmission input shaft, for example when designing the reverse gear, the nearest of the pendulum masses 17e can at least partially axially overlap the nearest of the spur gears 7d, for reasons of construction space.

In the depicted exemplary embodiment, the centrifugal force pendulum 13d assigned connected to the transmission input shaft 5d is positioned on the end of the transmission input shaft 5d between the dual-clutch 8d and the crankshaft 3d, with an inertial mass, such as a single-mass or dual-mass flywheel that can be situated on the latter.

What is claimed is:

1. A drive train comprising:

an internal combustion engine having a crankshaft;

a transmission including a plurality of axially spaced spur gears for setting different transmission gear ratios, and including at least one transmission input shaft coupled to the crankshaft by a friction clutch including a clutch plate received within a clutch housing and connected in a rotationally locked manner to the at least one transmission input shaft, wherein the clutch plate includes a torsional vibration damper to damp torsional vibrations in the spur gears of the transmission; and a centrifugal force pendulum carried on the at least one transmission input shaft and separate from the friction clutch and at an axial distance from the clutch plate, wherein the centrifugal force pendulum includes pendulum masses supported on rollers carried by a radially extending pendulum flange member that is non-rotatably carried on the at least one transmission input shaft;

wherein the centrifugal force pendulum is situated at an end of the transmission input shaft that extends through the spur gears, and the spur gears are positioned between the friction clutch and the centrifugal force pendulum.

2. A drive train comprising:

an internal combustion engine having a crankshaft;

a transmission including a plurality of axially spaced spur gears for setting different transmission gear ratios, and including at least one transmission input shaft coupled to the crankshaft by a friction clutch including a clutch plate received within a clutch housing and connected in a rotationally locked manner to the at least one transmission input shaft, wherein the clutch plate includes a torsional vibration damper to damp torsional vibrations in the spur gears of the transmission; and a centrifugal force pendulum carried on the at least one transmission input shaft and separate from the friction clutch and at an axial distance from the clutch plate, wherein the centrifugal force pendulum includes pendulum masses supported on rollers carried by a radially extending pendulum flange member that is non-rotatably carried on the at least one transmission input shaft;

wherein the transmission is a dual-clutch transmission that includes two sub-transmissions, each sub-transmission having a respective transmission input shaft, one of the two sub-transmissions having a hollow transmission input shaft;

wherein the centrifugal force pendulum is non-rotatably carried directly on the hollow transmission input shaft;

wherein each sub-transmission includes a respective set of spur gears and the centrifugal force pendulum is situated between the sets of spur gears of the sub-transmissions.

3. The drive train according to claim 2, wherein at least one pendulum mass carried by the centrifugal force pendulum is situated radially outwardly of a radially outermost surface of at least one spur gear of one of the sets of spur gears carried on the hollow transmission input shaft, and wherein the at least one pendulum mass at least partially axially overlaps the at least one spur gear.

* * * * *